United States Patent Office 3,329,195
Patented July 4, 1967

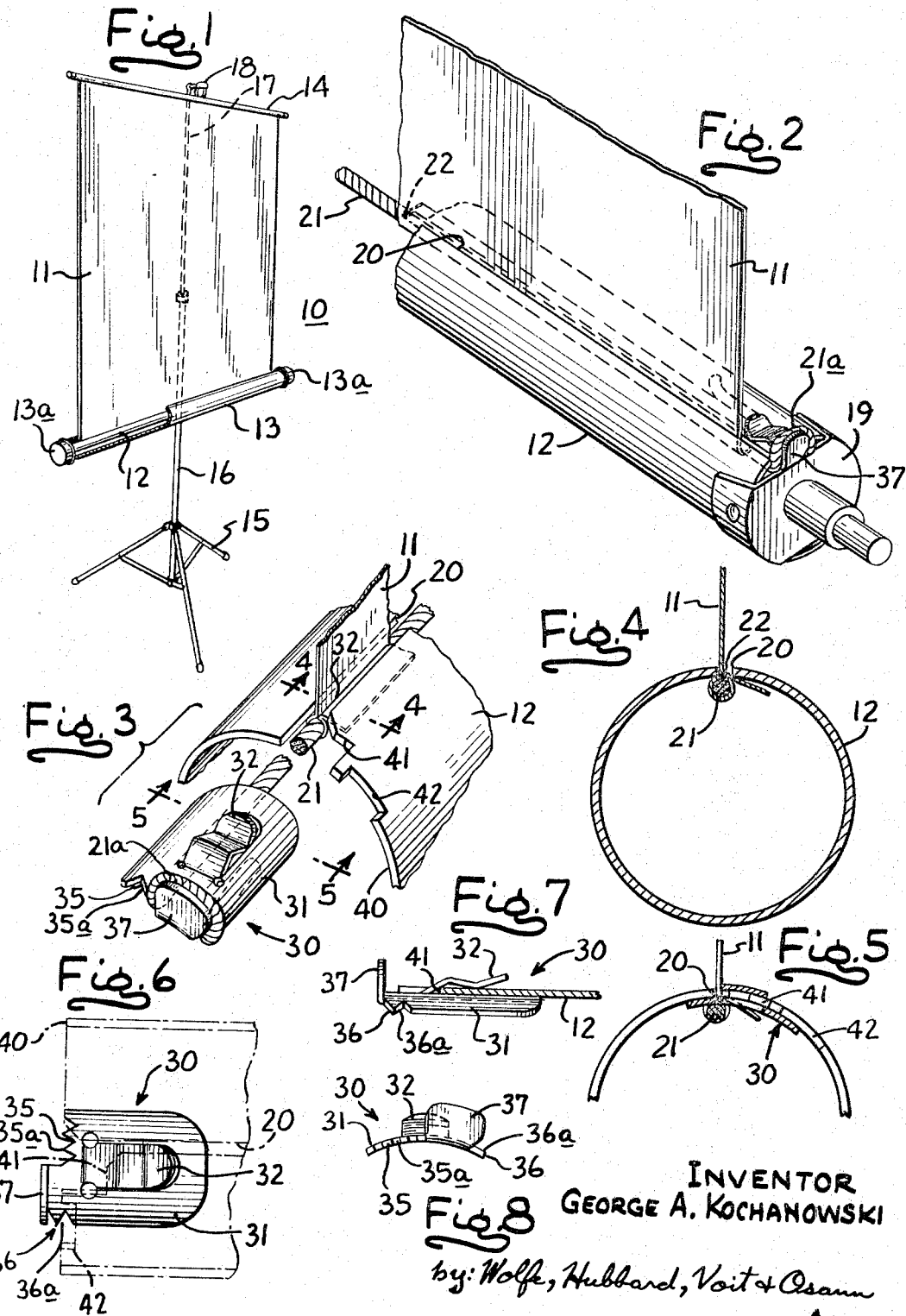

3,329,195
PROJECTION SCREEN OR THE LIKE
George A. Kochanowski, Chicago, Ill., assignor to Kinkead Industries Incorporated, Chicago, Ill., a corporation of Illinois
Filed May 24, 1965, Ser. No. 458,082
8 Claims. (Cl. 160—24)

The present invention relates to rolled screens and more particularly to the type of screen used for photographic projection.

It is an object of the present invention to provide a projection screen which rolls straight and which presents a flatter viewing surface than screens which have been employed in the past. More specifically it is an object of the present invention to provide improved anchoring means for anchoring the end of the screen to the roller on which it is wound, establishing an attachment between the screen and roller in which the geometry is constant and symmetrical along the entire width of the screen so that the screen is equally tensioned along its width when the screen is extended and to insure straight rolling when the screen is rolled up.

It is a still further object of the present invention to provide a novel retaining clip construction for maintaining the end of the screen centered in an anchoring slot and which may be constructed and installed at exceedingly low cost.

Other objects and advantages of the invention will become apparent upon reading the attached detailed description and upon reference to the drawing in which FIG. 1 is a perspective view of a projection screen embodying the present invention and with portions of the casing broken away to reveal the cylindrical roller.

FIG. 2 is a fragmentary perspective showing one end of the roller and screen of FIG. 1.

FIG. 3 is a fragmentary exploded view of the clip and roller end separated from one another.

FIG. 4 is a section taken along the line 4—4 of FIG. 3.

FIG. 5 is a fragmentary section looking along the line 5—5 of FIG. 3.

FIG. 6 is a top view of the clip with the roller indicated in phantom.

FIG. 7 is a side view of the clip.

FIG. 8 is an end view of the clip.

While the invention has been described in connection with a preferred embodiment, it will be understood that I do not intend it to be limited to the particular embodiment shown but intend to cover the various alternative and equivalent constructions falling within the spirit and scope of the appended claims.

Turning to the drawing, FIGURE 1 shows a screen assembly 10 including a screen 11 of flexible material anchored at its lower end in a roller 12 which is rotatably mounted in a cylindrical casing 13. The upper end of the screen is secured in a horizontal bar 14. Support is provided by a tripod 15 having a hollow upright 16 which telescopingly receives an extension rod 17. The latter has a hook 17 at its upper end which engages a pull-out or supporting ring at the center of the bar 14. A coil spring is conventionally provided within the roller 12 for causing the screen to be rolled up within the casing when the bar at the upper end of the screen is unhooked. Rotation occurs at bearing members such as indicated at 19 in FIG. 2 which are secured to the ends of the roller for journaling in end caps 13a on the casing. The coil spring and bearing details are outside the scope of the present invention and need not be discussed, reference being made to issued patents covering such features.

For securing the lower end of the screen 11 to the roller, the roller is of hollow construction with a narrow longitudinal slot 20 for retaining a cord 21 which is captively secured to the end of the screen. For example, the lower edge of the screen may be wrapped around the cord and stitched along the joint 22. The cord extends beyond the edges of the screen, the tail of the cord, on the near side, being indicated at 21a.

In accordance with the present invention retaining clips are provided at the respective ends of the roller 12, bridging the slot 20 and having axially-facing retaining edges aligned with the slot and about which the end portion 21a of the cord is passed for holding the cord under tension and centered in the slot along the entire width of the screen. More specifically I provide a retaining clip 30 having a generally flat body portion 31 and a tab 32 for securing the same to the presented edge of the cylindrical roller, the tab being preferably integral and struck out of the body portion 31. For the purpose of engaging and holding the end portion of the cord 21 in tension, the clip has a "retaining" edge 35 which is axially-facing and aligned with the slot 20. In order to insure a positive grip between the edge 35 and the cord the edge is preferably serrated, having one or more teeth 35a.

For the purpose of anchoring the free end of the cord, the clip is preferably provided with an "anchoring" edge 36 having one or more teeth 36a, the edge 36 being preferably arranged at right angles to the edge 35. A flange 37 in the form of an upwardly bent tab extending between the retaining edge 35 and the anchoring edge 36 serves to hold the cord in place. The bitter end of the cord, after leaving the anchoring edge 36, is tucked into the end of the roller.

It is one of the more detailed features of the present construction that the cooperating edge of edge 40 of the roller is notched adjacent the slot 20 as indicated at 41 in order to register with the securing tab 32 and to permit the clip to occupy a more recessed position with respect to the roller. The notch 41, moreover, insures that the retainer clip will remain fixed in position, with the retaining edge 35 thereof kept in precise alignment with the longitudinal slot 20 during the life of the device. If desired a second, shallower notch 42 may be provided in the edge of the roller for accommodating the inwardly bent end of the cord.

While the retainer clip 30 at one end only of the roller has been described, it will be understood that a similar clip, not shown, is used at the opposite end. When employing the present invention the end of the screen 11 is "threaded" edgewise into the slot 20, the width of the slot being sufficient to pass the screen but yet sufficiently narrow with respect to the diameter of the cord 21, as to hold the end of the screen securely captive. With the screen centered axially clips 30 are slipped into position at each end. The clips are inserted until the tabs 32 thereon are securely seated in the registering notches 41. Sufficient frictional force is exerted by the tabs to prevent accidental dislodgment. The cord 21 is then stretched tight with the ends 21a thereof being bent or turned sharply over the serrated retaining edges 35. The free ends 21a are then turned laterally into a seated position behind the flange 37 and around the anchoring edge 36. It is preferred to use a rather loosely woven or twisted cord 21 which, while made of strong fiber, enables the teeth 35a, 36a to "dig in," thus preventing any slippage and providing an anchorage which may be relied upon over the life of the screen itself. Of course if it should be necessary for any reason to disassemble the screen from the roller this can be easily accomplished by reversing the above procedure. And if it should be necessary to increase the tension applied to the cord 21, this can be easily done by unwinding the cord from the clip, applying tension, and then rewinding into seated position.

It is found that the retaining edge 35 provided by the present clip, which bridges the slot 20 and which is centered with respect to the slot, causes a condition of geometrical symmetry to be achieved along the entire width of the screen. Thus the conditions of anchorage are precisely the same from point to point along the entire width of the screen which may, in a practical case, be four to six feet or more. The anchoring arrangement is thus to be contrasted with prior arrangements in which the cord at the lateral edges of the screen is led off to one side of the retaining slot, setting up a condition at the edges of the screen which differs from that at the center. This has resulted in waviness, curling or puckering of the screen, whereas the present anchoring arrangement provides a screen which has a flat viewing surface and which rolls up evenly without any tendency to creep in one direction or the other.

One advantage of the present construction is that it utilizes an existing type of clip referred to in the trade as a "Tinnerman" clip made of hardened steel and available at extremely low cost. The standard "Tinnerman" clip may be modified to practice the present invention by the simple expedient of grinding the serrated edges 35, 36 respectively into the clip body to approximately the profile shown. It will be understood, moreover, that one may depart from the specific profile without departing from the invention; for example, the teeth may be somewhat different in number or shape, indeed, the teeth may be omitted at at least one of the edges without departing from the invention, with reliance upon the holding effect at the remaining serrated edge.

While the invention has been described in connection with a projection screen, it will be understood that use of the invention is not limited thereto and that the inventive construction may in fact be employed wherever it is desired to connect a sheet of flexible material to a supporting roller.

I claim as my invention:

1. In a roll type projection screen or the like, the combination comprising a hollow cylindrical roller having a wall including a longitudinal slot running the length thereof, a flexible screen having a captive anchoring cord extending along the end thereof for retention in said slot, said cord having tail end portions, a retaining clip at each end of the slot, each retaining clip having a flattened body portion and an overlying tab spaced from the body portion for fitting over the cylinder wall at the ends of the roller, each of said clips extending across said slot and having a serrated shoulder aligned with the slot for engaging the respective ends of the cord to hold the same tensioned in centered position under the slot, and means on the clip for anchoring the free end of the cord.

2. In a roll type projection screen or the like, the combination comprising a hollow cylindrical roller having a longitudinal slot running the length thereof, a flexible screen having a captive anchoring cord extending along the end thereof for retention in said slot, said cord having tail end portions, clips axially seated at the ends of the roller and extending bridgingly across said slot, said clips having respective axially-facing retaining edges aligned with the slot for engaging the end portions of the cord for holding the cord tensioned in a position centered in the slot, and means for anchoring the free ends of the cord.

3. In a roll type projection screen or the like, the combination comprising a hollow cylindrical roller having a longitudinal slot running the length thereof, a flexible screen having a captive anchoring cord extending along the end thereof for retention in said slot, said cord having tail end portions, axially seated clips at the ends of the roller extending bridgingly across the slot, said clips presenting serrated axially-facing edges aligned with the slot for engaging the end portions of the cord to hold the same tensioned in a position centered in the slot, and means for anchoring the free ends of the cord.

4. In a roll type projection screen or the like, the combination comprising a hollow cylindrical roller having a longitudinal slot, a flexible screen having a captive anchoring cord extending along the end thereof for retention in the slot, said cord having tail end portions, retaining clips axially seated at the ends of the roller and extending bridgingly across the slot for enclosing the ends of the slot, said clips presenting axially facing serrated edges for engagement by the end portions of the cord for holding the cord tensioned in a position centered in the slot, said clip having a second serrated edge spaced from first serrated edge for anchoring the free ends of the cord.

5. In a roll type projection screen or the like, the combination comprising a hollow cylindrical roller having a longitudinal slot, a flexible screen having a captive anchoring cord extending along the end thereof for retention in said slot, said cord having tail end portions, retaining clips axially seated at the ends of the roller and extending bridgingly across the slot, each of said clips having a serrated axially-facing retaining edge aligned with the slot for engaging the end portions of the cord and holding the same in tension in a position centered with respect to the slot, each of said clips further having a serrated anchoring edge arranged substantially perpendicular to the retaining edge for engaging and anchoring the respective free ends of the cord.

6. In a roll type projection screen or the like, the combination comprising a hollow cylindrical roller having a longitudinal slot and axially-facing edges, a flexible screen having a captive anchoring cord extending along the end thereof for retention in said slot, said cord having tail end portions, retaining clips seated on the axially-facing edges of the roller to provide a retaining edge which extends bridgingly across the slot at each end of the roller for engaging the end portions of the cord when the same is tensioned in a centered position in the slot, the axially-facing edges of the roller being notched out adjacent the slot to accommodate the clip in a recessed position and to retain the clip against the peripheral movement away from the slot.

7. For use with a roll type projection screen or the like, including a hollow cylindrical roller having a longitudinal slot and a flexible screen having a captive anchoring cord extending along the end thereof for retention in the said slot, a clip comprising, in combination, a generally flat body portion, an integral spaced from the body portion for securing the clip to the end of the cylindrical roller in a position to bridge the slot, the body portion of the clip having a serrated axially-facing edge capable of gripping the cord, said clip having a second serrated edge spaced from the first for anchoring the free end of the cord to the clip.

8. For use with a roll type projection screen or the like including a hollow cylindrical roller having a longitudinal slot and a flexible screen having a captive anchoring cord extending along the end thereof for retention in the said slot, a clip comprising, in combination, a generally flat body portion, an integral tab anchored to one end of the body portion and extending generally parallel thereto, the said end of the body portion of the slip having a first serrated edge for engaging a first pass of a cord and a second serrated edge at generally right angles thereto for engaging a second pass of the cord for anchoring the cord to the slip.

References Cited

UNITED STATES PATENTS 3,228,455   1/1966   Jacobson _____ 160—24

DAVID J. WILLIAMOWSKY, *Primary Examiner.*

HARRISON R. MOSELEY, *Examiner.*

J. K. BELL, *Assistant Examiner.*